(12) United States Patent
Jainek

(10) Patent No.: US 8,613,854 B2
(45) Date of Patent: Dec. 24, 2013

(54) FILTER ELEMENT FOR LIQUID FILTERS AND LIQUID FILTER

(75) Inventor: Herbert Jainek, Heilbronn (DE)

(73) Assignee: Mann + Hummel GmbH, Ludwigsburg (DE)

( * ) Notice: Subject to any disclaimer, the term of this patent is extended or adjusted under 35 U.S.C. 154(b) by 526 days.

(21) Appl. No.: 12/741,917

(22) PCT Filed: Nov. 7, 2008

(86) PCT No.: PCT/EP2008/065142
§ 371 (c)(1),
(2), (4) Date: May 26, 2010

(87) PCT Pub. No.: WO2009/060072
PCT Pub. Date: May 14, 2009

(65) Prior Publication Data
US 2010/0230342 A1    Sep. 16, 2010

(30) Foreign Application Priority Data
Nov. 9, 2007   (DE) .......................... 10 2007 053 872

(51) Int. Cl.
*B01D 35/153*    (2006.01)
(52) U.S. Cl.
USPC ............................ 210/136; 210/248; 210/440
(58) Field of Classification Search
CPC ............................ B01D 27/106; B01D 35/153
USPC ....... 210/232–238, 136, 440, 450; 123/196 A
See application file for complete search history.

(56) References Cited

U.S. PATENT DOCUMENTS

| 3,231,089 A | 1/1966 | Thorton |
| 5,413,712 A * | 5/1995 | Gewiss et al. ................. 210/450 |
| 6,706,181 B1 * | 3/2004 | Baumann et al. ............. 210/236 |
| 6,936,162 B1 | 8/2005 | McKenzie |

FOREIGN PATENT DOCUMENTS

| DE | 202005012435 | 12/2006 |
| DE | 102006029107 | 1/2007 |
| WO | WO 2007003517 A2 * | 1/2007 |
| WO | WO2007003517 A2 | 1/2007 |

OTHER PUBLICATIONS

PCT search report for PCT/EP2008/065142, Apr. 2009.

* cited by examiner

*Primary Examiner* — Terry Cecil
(74) *Attorney, Agent, or Firm* — James Hasselbeck

(57) ABSTRACT

The invention concerns a filter element as well as a liquid filter wherein the filter element is axially insertable into the filter housing (10, 11). The filter element (21) effects after mounting the closure of a non-return device for the raw liquid to be filtered with at least one non-return diaphragm (27). The non-return diaphragm (27) is attached to a terminal disk (24) of the filter element (21) in such a way that it effects an axial and/or a radial sealing action of the raw side (32) relative to the clean side (33) in the filter housing (10, 11). On the filter housing (10, 11) a drainage opening (18) for liquid is provided that is closed off by an additional sealing surface (31, 49) of the non-return diaphragm (27) when the filter element (10, 11) is installed.

6 Claims, 4 Drawing Sheets

FILTER ELEMENT FOR LIQUID FILTERS AND LIQUID FILTER

CROSS REFERENCE TO RELATED APPLICATIONS

This application is US National Stage Entry of international patent application no. PCT/EP2008/065142, filed Nov. 7, 2008 designating the United States of America, the entire disclosure of which is incorporated herein by reference. Priority is claimed based on Federal Republic of Germany patent application no. 10 2007 053 872.5, filed Nov. 9, 2007.

TECHNICAL FIELD

The invention concerns a filter element for liquid filters and a liquid filter, in particular for oil or fuel of internal combustion engines.

PRIOR ART

According to WO 2007/003517 A2 filter elements for liquid filtration of viscous media such as oil or fuel are produced conventionally of pleated filter media, preferably in cylindrical shape. These filter elements can be free of metal and provided with a terminal disk of film, cardboard, a synthetic material, for example, PA, or the like. However, embodiments with metallic terminal disks and a metallic central tube are possible also. The folds of the filter element are often embedded into the terminal disks, for example, glued, welded or foamed, and therefore connect these elements directly.

For preventing drainage of the filter housing in the direction of the raw side, often a spring-loaded valve is also used that is introduced permanently into the housing. These non-return valves are inserted in a separate assembly step into the housing. The non-return valves are comprised usually of a valve plate that is pretensioned by a spring, a valve crown and a valve seat. The valve is glued, screwed or press-fit into the housing, wherein, in general, it is a disadvantage that this component requires complex mounting.

It is an object of the invention to provide a filter element for liquid filters, as well as a liquid filter, that can be mounted in a simple way and produced inexpensively.

SUMMARY OF THE INVENTION

The filter element according to the invention is provided for use in an openable filter housing, in particular of liquids. The filter element comprises an annularly closed filter medium that is embodied by folding or winding a web-shaped paper or nonwoven material. Moreover, the filter medium can also be formed of a block-shaped pressed material. At the end face, the filter medium is seal-tightly connected to an upper terminal disk and a lower terminal disk. This connection, which is embodied to be non-detachable, can be generated, for example, by welding, gluing or foaming. At one of these terminal disks a non-return diaphragm is arranged that is comprised of a liquid-tight, elastic material that is resistant to the liquids to be filtered, in particular, elastomers such as propylene tetrafluoroethylene rubber (FPM), hydrogenated nitrile butadiene rubber (HNBR), acrylate rubber (ACM). In this connection, the non-return diaphragm is embodied such that it covers an inlet opening in the filter housing wherein the non-return diaphragm is lifted off by the flow of liquid to be purified. The non-return diaphragm comprises an annular surface that contacts an annular surface of the filter housing. When there is no flow through the liquid filter, the contacting annular surface of the non-return diaphragm closes off the inlet opening such that no liquid can return from the filter housing and the filter housing cannot be drained. This is advantageous because, when newly starting the filtration process, the housing is already filled and must not be filled anew, for example, in order to build up quickly the required oil pressure when starting an internal combustion engine. Accordingly, purified liquid is available much quicker.

Advantageously, the non-return diaphragm is embodied such that it effects a sealing action between a raw side and a clean side. For this purpose, the non-return diaphragm has sealing contours that form in the filter housing a seal-tight separation between the raw side and the clean side. These sealing contours are, for example, embodied as radially inwardly oriented beads that are supported radially on a tube that forms the clean outlet. Alternatively, the sealing contour of the non-return diaphragm can also be embodied so as to seal axially and be supported on an annular support surface.

The non-return diaphragm according to the invention comprises an additional sealing surface which, as a further function, closes off an outlet opening that is provided in the filter housing. This outlet opening is provided for draining the filter housing when the filter element must be exchanged. The arrangement of the sealing surface on the non-return diaphragm produces the closure of the outlet opening upon mounting of the filter element without an additional working step. A further advantage resides in that no additional components are required, and the integral shaping of the sealing surface on the existing non-return diaphragm without requiring additional material is thus beneficial with respect to costs.

The additional sealing surface can be embodied as an axial sealing surface or a radial sealing surface. In the embodiment as an axial sealing surface, in the area of the outlet opening a planar bottom of the filter housing is sufficient in order to generate a reliable axial sealing action. In this connection, the axial sealing surface is simply placed axially onto this area. The axial sealing surface can be embodied as a segment that in cross-section must be embodied to be somewhat larger than the drainage opening in order to be able to completely seal-tightly cover it. By means of a certain pretension, which is, for example, transmitted by a coil spring onto the filter element, a reliable sealing action is achievable. In case of a radial sealing action, geometries are provided that are supported radially in a linear shape on a circumferential wall. In this connection, the radial seal can be formed integrally on a cylindrical pin that can be inserted into a cylindrically embodied drainage bore. This is advantageous when the filter element is exposed to vibrations because in this embodiment an accidental lift-off away from the outlet opening is prevented.

According to an advantageous embodiment of the invention, the additional sealing surface is embodied as an annular surface. Accordingly, the filter element can be inserted in any radial position into the filter housing. In addition to the axial movement upon insertion into the filter housing, the filter element can perform a rotation without there being the risk of a leak in the area of the drainage opening. Accordingly, in comparison to a sealing surface embodied as a segment, mounting is significantly simplified.

It is advantageous to injection-mold integrally the non-return diaphragm onto the lower terminal disk wherein all sealing surfaces are produced by primary shaping technology. This is a fast and inexpensive possibility for producing the non-return diaphragm. Moreover, no mounting step is required. A further advantage is that the non-return diaphragm is connected seal-tightly and non-detachably to the terminal disk and in this way leakage between the terminal disk or an accidental detachment from the terminal disk is prevented.

The liquid filter according to the invention has a filter element and an openable filter housing with an inlet opening for the liquid to be purified, an outlet opening for the purified liquid, and a drainage opening for pressureless drainage of the liquid contained in the filter housing in order to prevent escape of liquid during filter element exchange. The filter element is insertable axially into the filter housing. The filter element is designed in accordance with the preceding embodiments. In this connection, the non-return diaphragm seals the clean side relative to the raw side. Moreover, the non-return diaphragm fulfills the function of a non-return valve for the inlet opening. As a further function, the non-return diaphragm seals with an additional sealing surface the drainage opening. In this way, several functions, in particular sealing functions, are integrated within a single component. The non-return diaphragm can be produced in a simple way and can be mounted easily. Since the sealing function is arranged directly on the non-return diaphragm that is connected with the filter element, additional mounting steps as they are required for spring-loaded separately mounted non-return valves are no longer needed. Moreover, expensive valves are made obsolete by integration of the sealing function into the non-return diaphragm.

In order to ensure complete drainage of the filter housing, it is advantageous to arrange the drainage opening at a low point in the filter housing.

In a special embodiment of the invention the drainage opening is arranged in an annular groove. The additional sealing surface on the non-return diaphragm is also designed to have an annular shape and can be inserted into the groove in a seal-tight manner. In this connection, it is advantageous when the sealing surface is embodied as a radial seal. In this way, the filter element can be inserted into the filter housing in any rotational position. The radial seal forms in this connection an additional positioning aid in radial direction.

It is advantageous that the filter housing comprises a contact shoulder for axial positioning of the filter element. This contact shoulder can be embodied as a radially circumferentially extending edge or an edge that is partially distributed on the circumference. In this connection, the filter element has on the lower terminal disk an appropriate matching contour that is supported on this edge. In case of a circumferentially extending edge in the filter housing the matching contour is embodied in segmented form. In case of an edge that is partially distributed about the circumference, the matching contour is continuous. In this way, a reliable positioning in axial direction without great tolerance fluctuations is possible.

According to an advantageous embodiment, clamping means, for example, coil springs, clamping brackets or injection-molded integral fins are provided with which the additional sealing surface of the non-return diaphragm can be pressed onto the drainage opening. In this way, the sealing surface cannot lift off the drainage opening even when exposed to vibrations. An accidental drainage of the liquid can thus be prevented.

BRIEF DESCRIPTION OF THE DRAWINGS

The invention will be explained in the following with the aid of embodiments in more detail. It is shown in.

EMBODIMENT(S) OF THE INVENTION

Figure 1:
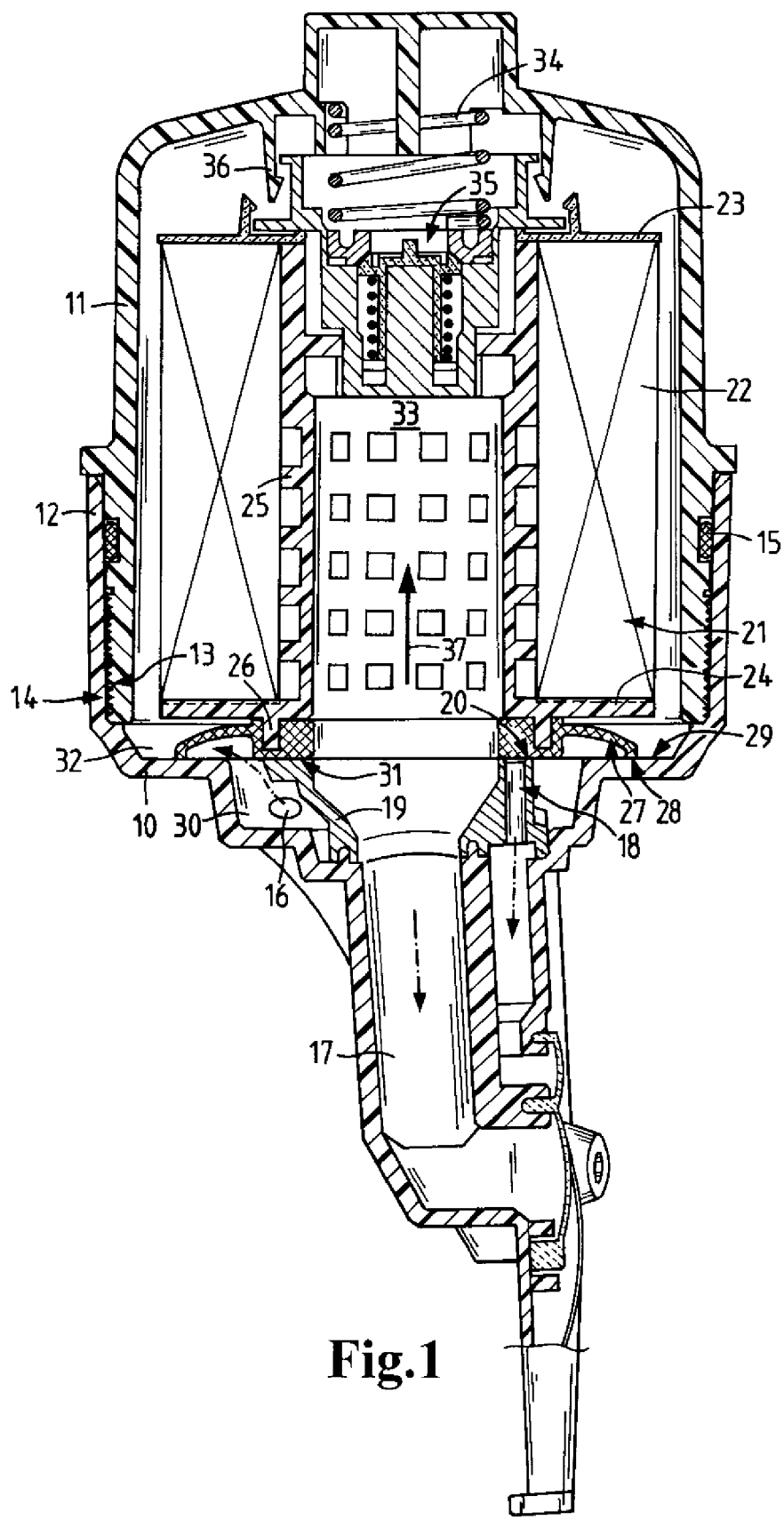
FIG. 1 a liquid filter in section view.

In FIG. 1, a liquid filter is shown in section view. The liquid filter comprises a housing bottom part 10 and a housing top part 11. The housing parts 10, 11 are comprised of thermoplastic synthetic material, for example, polyamide (PA) or polypropylene (PP), and are produced advantageously by injection molding technology. Alternatively, the housing parts 10, 11 can also be produced by aluminum die casting. Material combinations in which one housing part 10 or 11 is comprised of synthetic material and the other housing part 10 or 11 of metal are also possible. The housing bottom part 10 has a cup 12 that is open in upward direction and comprises on its inner wall an inner thread 13. An outer thread 14 of the housing part 11 engages this inner thread 13 so that housing parts 10, 11 are connected detachably to one another. For sealing the housing parts 10, 11, an O-ring 15 is provided. In the interior of the housing bottom part 10 an inlet opening 16, an outlet opening 17, and a drainage opening 18 are arranged. In this connection, the housing bottom part 10 has an insert 19 which is non-detachably and seal-tightly connected to the housing bottom part 10. By means of the insert 19, on the one hand, the separation between the individual openings 16, 17, 18 is achieved and, on the other hand, the insert is embodied such that a sealing surface 20 is formed for the filter element 21 arranged in the housing 10, 11. In other embodiments, the insert 19 can be eliminated and its geometries integrally formed on the housing bottom part 10.

The filter element 21 comprises a zigzag-folded and annularly closed filter medium 22. On its end faces the filter medium 22 is connected by gluing in a seal-tight way with an upper terminal disk 23 and a lower terminal disk 24. The lower terminal disk 24 is embodied as a monolithic part together with a central tube 25 that supports the filter medium 22 which medium is permeable for the liquid to be purified. On the lower terminal disk 23 a continuous annular projection 26 that projects downwardly is arranged on which a non-return diaphragm 27 is integrally injection-molded. The non-return diaphragm 27 has a circumferentially extending sealing rim 28 that is supported on a surface 29 of the housing bottom part 10. The surface 29 surrounds an annular space 30 into which the inlet opening 16 opens and which is delimited inwardly by the insert 19. Moreover, the non-return diaphragm 27 comprises an axial sealing surface 31 which is seal-tightly supported on the sealing surface 20. In this way, a seal-tight separation between raw side 32 and clean side 33 is provided. The raw side 32 is formed between the filter element 21 and the housing parts 10, 11 that are in communication with the inlet opening 16. The clean side 33 is enclosed by the filter element 21 and communicates with the outlet opening 17 for the purified liquid. As a third function, the non-return diaphragm 27 seals the drainage opening 18 in axial direction. In order to generate a satisfactory contact pressure of the axial sealing surface 31 on the sealing surface 20, a coil spring 34 is provided which is clamped between the housing part 11 and the upper terminal disk 23 of the filter element 21. In this way, an accidental lift-off away from the axial sealing surface 31 is prevented.

As a result of soiled filter media or liquids of too low a viscosity, the passage through the filter element 21 can be reduced so that the differential pressure between the raw side 32 and the clean side 33 surpasses a defined value. The filter element 21 comprises a bypass valve 35 that opens when surpassing a defined differential pressure.

In normal operation of the liquid filter, the liquid to be purified flows through the inlet opening 16 into the annular space 30 of the filter housing 10, 11 (dash-dotted arrow) and lifts the sealing rim 28 off the surface 29. The liquid flows through the filter medium 22 from the exterior to the interior and passes also through the central tube 25. From the clean side 33 the purified liquid exits through the outlet opening 17 out of the liquid filter (dash-doted arrow).

In the state without flow, no liquid enters through the inlet opening 16. The sealing rim 28 rests seal-tightly on the surface 29 and prevents in this way that liquid will return from the raw side 32 into the inlet opening 16. In this way, the non-return diaphragm 27 prevents drainage of the filter housing 10, 11 so that liquid is available immediately when starting again.

In order to exchange the filter element 21, the housing top part 11 is detached from the housing bottom part 10 and is lifted axially upwardly. In this way, the pretension of the coil spring 34 on the filter element 21 is reduced. By snap hooks 36 on the housing top part 11 the bypass valve 35 is pulled axially upwardly. The filter element 21 is snap-connected to the bypass valve 35 so that the filter element 21 is also pulled axially upwardly. As a result of this axial stroke the drainage opening 18 is released and the liquid contained in the filter housing 10, 11 can drain in a pressureless state. Until the housing top part 11 is completely removed, the liquid level has dropped below the edge of the cup 12 and no liquid will escape. The filter element 21 is removed in the direction of arrow 37 axially out of the housing part 10, the snap-connection with the bypass valve 35 is released and disposed of. A new filter element 21 is preferably first snap-connected the bypass valve 35 and subsequently inserted opposite to the direction of arrow 37 and pressed seal-tightly onto the sealing surface 20 by positioning and screwing on the housing top part 11. In this way, a new sealing action between the raw side 32 and the clean side 33 and sealing of the drainage opening 18 are effected. Moreover, the annular space 30 is covered by the non-return diaphragm 27.

Figure 2:
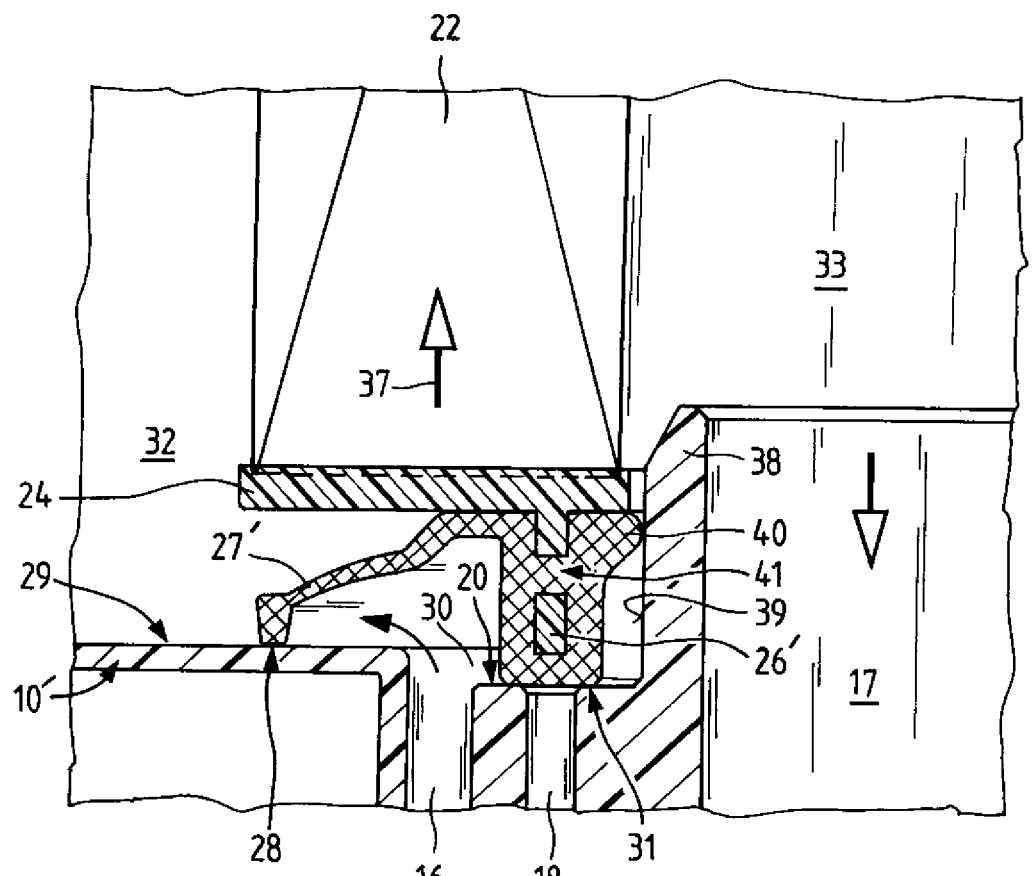
FIG. 2 a detail of the liquid filter in an alternative embodiment.

FIG. 2 shows a detail of the liquid filter in an alternative embodiment in section view. Components that correspond to those of FIG. 1 have the same reference numerals. In contrast to FIG. 1, the housing bottom part 10' is designed such that all surfaces and contours are directly integrally formed and the insert 19 according to FIG. 1 is eliminated. The outlet opening 17 is arranged on an axially upwardly projecting sleeve 38. This sleeve 38 has a surface 39 on which a sealing bead 40 rests seal-tightly and effects the separation between the raw side 32 and the clean side 33. This sealing action is formed by a radially acting seal. In this embodiment, the three sealing functions of the non-return diaphragm 27' are distributed onto three spatially separated sealing areas. In this way, the sealing function of the other sealing locations is ensured should one sealing location have leaks. A further difference to the embodiment illustrated in FIG. 1 resides in that the annular projection 26' has gaps 41 that are filled with material of the non-return diaphragm 27'. In this way, an improved connection between the terminal disk 24 and the non-return diaphragm 27' is achieved that can absorb greater mechanical loads as they are generated, for example, when producing or releasing the radial sealing action between the sealing bead 40 and the surface 39.

Figure 3:
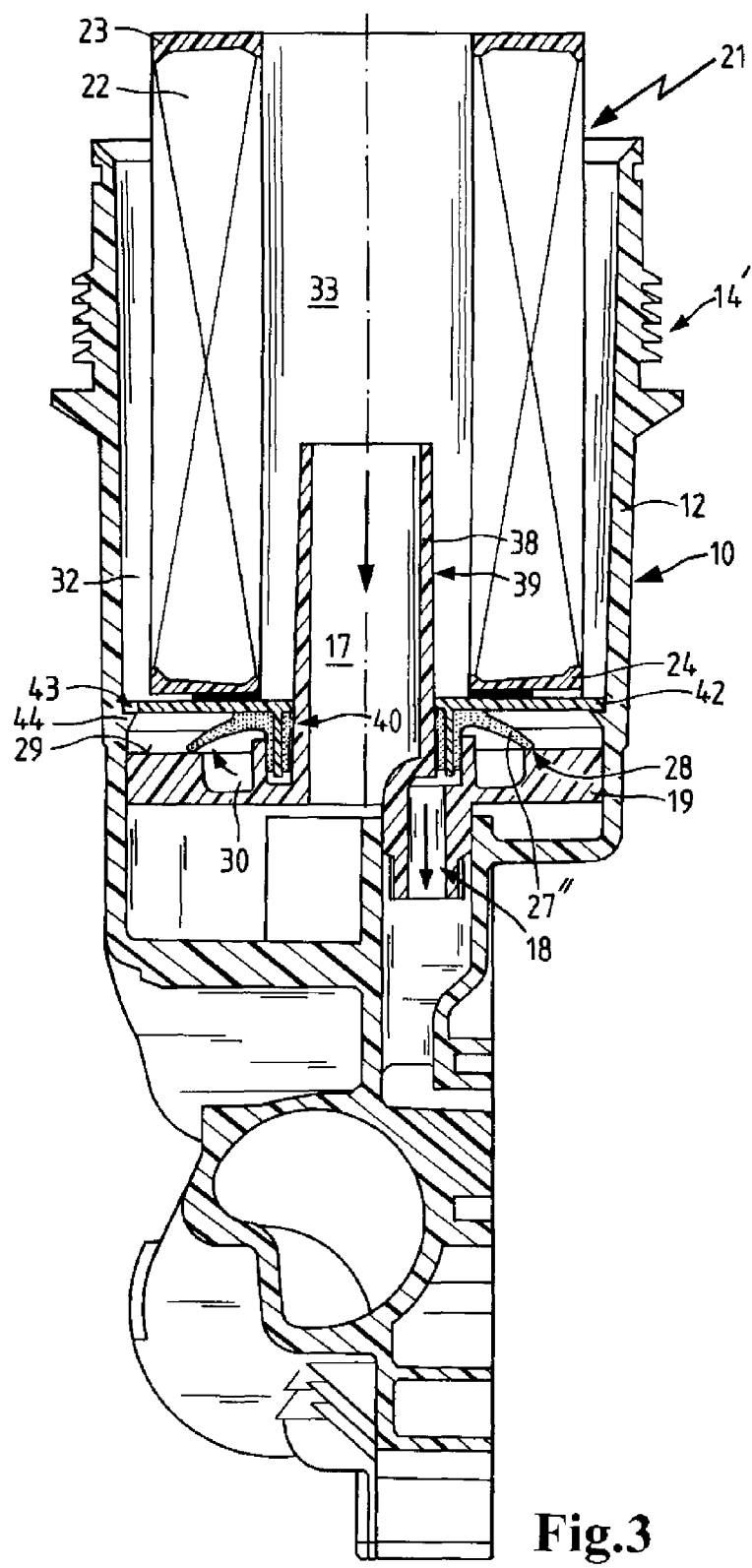
FIG. 3 an alternative embodiment of a liquid filter in section view.

In FIG. 3 an alternative embodiment of a liquid filter with radially acting sealing surface is shown in section view. Components that correspond to those of FIG. 1 or 2 have the same reference numerals. In contrast to the preceding FIGS. 1 and 2, the filter element 21 has foamed terminal disks 23, 24 that enclose seal-tightly the filter medium 22. On the lower terminal disk 24 an end plate 42 of thermoplastic material is arranged on which the non-return diaphragm 27" is formed. The non-return diaphragm 27" has in addition to the axially acting seal formed by the sealing rim 28 and the surface 29 two radially acting seals of the separation of the raw side 32 from the clean side 33 as well as for sealing the drainage opening 18. This sealing concept is illustrated in FIG. 4 in detail view.

The end plate 42 has at its circumference a toothed area 43 that comprises recesses and projections distributed about the circumference. By means of this toothed area 43 the end plate 42 finds support on an annular shoulder 44 that is arranged on the housing bottom part 10. In this way, the filter element 21 can be positioned in a precise axial position in the housing bottom parts 10 so that the non-return diaphragm 27" is pressed always with the same pretension against the surface 29 and damage by too strong a pressure is prevented. This type of positioning is subject to only minimal tolerance fluctuations because the tolerance-afflicted axial length of the filter element 21 is not required for positioning. The flow directions of the liquid to be purified correspond to the flow directions described in FIG. 1. The only difference is that the liquid to be purified will flow through between the annular shoulder 44 and the recesses of the toothed area 43. The exchange of the filter element 21 is also realized in the way disclosed in FIGS. 1 and 2.

Figure 4:
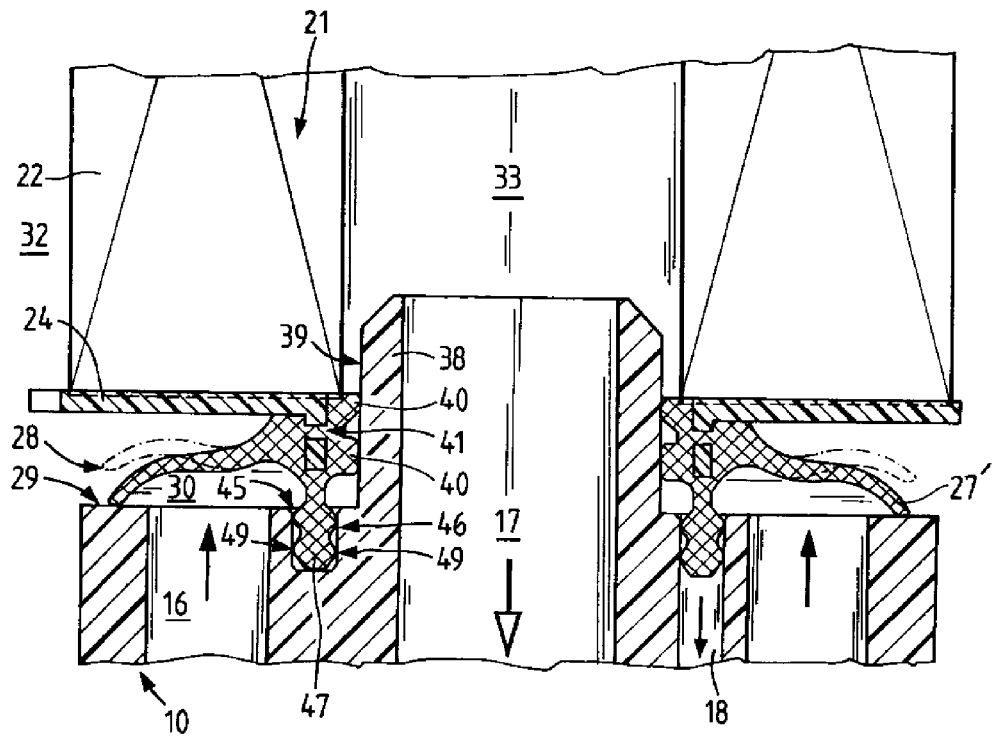
FIG. 4 a modified detail of liquid filter according to FIG. 3.

FIG. 4 shows a modified detail of the liquid filter according to FIG. 3 in section view. Components that correspond to those in FIGS. 1 to 3 are identified with same reference numerals. In contrast to FIG. 3, the housing bottom part 10 is embodied without insert 19. The housing bottom part 10 has an annular groove 45 in which the drainage opening 18 is arranged. Between the sidewalls of the annular groove 45 and the radial sealing surfaces 49 a radial seal 46 is generated. For this purpose, an annular circumferentially extending bulbous sealing collar 47 projects into the annular groove 45. In contrast to FIG. 3 the lower terminal disk 24 is formed of a shape-staple thermoplastic synthetic material wherein the functions of the end plate 42 are transferred onto the lower terminal disk 24.

Figure 5:
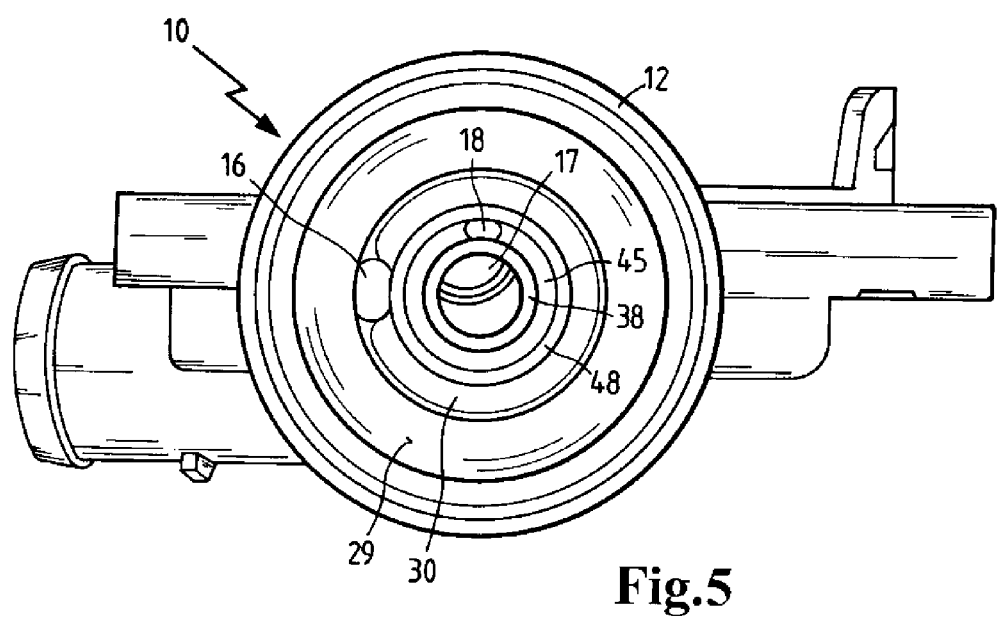
FIG. 5 a plan view onto the filter housing according to FIG. 4.

In FIG. 5 a plan view onto the filter housing according to FIG. 4 is illustrated. Components that correspond to those of FIG. 4 are identified with the same reference numerals. In this illustration, the annular configuration can be seen clearly. The outlet opening 17 is centrally arranged and is surrounded by the sleeve 38. The annular groove 45 with the drainage opening 18 adjoins it. The annular groove 45 is separated by annular stay 48 from the annular space 30 wherein the inlet opening 16 is arranged in the annular space 30. The surface 29 surrounds circularly the annular space 30. By means of the concentrically arranged areas a rotation-symmetrical filter element 21 can be inserted in any radial position.

The invention claimed is:
1. A filter element (21) for use in an openable filter housing (10, 11), comprising:
an annularly closed filter medium (22);
an upper terminal disk (23) and a lower terminal disk (24) connected to end faces of the filter medium;
a non-return diaphragm (27) secured to one of said end disks and arranged such that it covers with one side an inlet opening (16) in the filter housing (10, 11);

wherein the non-return diaphragm (27) includes an annular additional sealing surface (31, 49) defining an axis and with which an outlet opening (17) of the filter housing is closable;

wherein said additional sealing surface (31) is embodied as an axial sealing surface (31), said additional sealing surface (31) placed axially onto a drainage opening (18) in the filter housing such that said additional sealing surface (31) axially abuts against and completely covers over and axially sealing on said drainage opening (18) to sealably close said drainage opening;

wherein said additional sealing surface (31) is larger in cross-section than said outlet opening (17), said additional sealing surface (31) placed axially onto said outlet opening (17) of said filter housing and axially sealing on said outlet opening (17).

2. The filter element (21) according to claim 1, wherein the non-return diaphragm (27) is integrally injection-molded on the lower terminal disk (24).

3. The filter element (21) according to claim 2, wherein the lower terminal disk includes a continuous annular projection (26) onto which said non-return diaphragm is molded.

4. The filter element (21) according to claim 2, wherein said non-return diaphragm comprises:

a circumferentially extending sealing rim configured to engage said filter housing to sealably separating the inlet opening from the filter medium;

a sealing surface sealably configured to engage said filter housing separating a clean side from a raw side of said filter medium;

a drainage sealing surface configured to engage said filter housing on a drainage opening to sealably close said drainage opening.

5. The filter element (21) according to claim 1, wherein the additional sealing surface (31, 40) also effects in the filter housing (10, 11) a sealing action between a raw side (32) of said filter and a clean side (33).

6. A liquid filter, comprising:

an openable filter housing (10, 11) comprising an inlet opening (16), an outlet opening (17), and a drainage opening (18);

a filter element (21) that is insertable axially into said openable filter housing (10, 11);

wherein the filter element (21) is embodied according to claim 1 and the drainage opening (18) is closable by the additional sealing surface (31, 49) of the non-return diaphragm (27).

* * * * *